United States Patent
Cserna et al.

(10) Patent No.: US 12,461,231 B2
(45) Date of Patent: Nov. 4, 2025

(54) THERMAL SENSOR DATA VEHICLE PERCEPTION

(71) Applicant: Motional AD LLC, Boston, MA (US)

(72) Inventors: Bence Cserna, East Boston, MA (US); Aravindkumar Vijayalingam, Singapore (SG); Ruben Strenzke, Singapore (SG)

(73) Assignee: Motional AD LLC, Boston, MA (US)

( * ) Notice: Subject to any disclaimer, the term of this patent is extended or adjusted under 35 U.S.C. 154(b) by 551 days.

(21) Appl. No.: 17/584,435

(22) Filed: Jan. 26, 2022

(65) Prior Publication Data
US 2023/0236313 A1    Jul. 27, 2023

(51) Int. Cl.
*G01S 13/931* (2020.01)
*B60W 60/00* (2020.01)
*G01J 5/00* (2022.01)
*G01S 17/931* (2020.01)

(52) U.S. Cl.
CPC ....... *G01S 13/931* (2013.01); *B60W 60/0016* (2020.02); *G01J 5/00* (2013.01); *G01S 17/931* (2020.01); *B60W 2420/40* (2013.01); *B60W 2420/403* (2013.01); *B60W 2420/408* (2024.01); *B60W 2420/54* (2013.01); *G01J 2005/0077* (2013.01)

(58) Field of Classification Search
CPC ........ G01S 17/931; G01S 17/86; G01S 17/89; G01S 17/894; G01S 13/931; G01S 13/865; G01S 13/89; G05D 1/0044; B60W 60/0027; B60W 60/0011; B60W 60/0017; B60W 30/09; B60W 30/0956; B60W 30/08; B60W 2420/40; B60W 2420/408

USPC ......................................... 342/53; 701/23, 26
See application file for complete search history.

(56) References Cited

U.S. PATENT DOCUMENTS

| | | | |
|---|---|---|---|
| 5,377,116 A | 12/1994 | Wayne et al. | |
| 5,999,212 A * | 12/1999 | Crosby | G01S 3/7864 348/169 |
| 6,151,539 A | 11/2000 | Bergholz et al. | |

(Continued)

FOREIGN PATENT DOCUMENTS

| CN | 111409631 | 7/2020 |
|---|---|---|
| CN | 112406860 A | 2/2021 |

(Continued)

OTHER PUBLICATIONS

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.

(Continued)

*Primary Examiner* — Michael W Justice
(74) *Attorney, Agent, or Firm* — Knobbe, Martens, Olson & Bear, LLP

(57) ABSTRACT

Provided are methods for thermal sensor data vehicle perception, which can include obtaining thermal sensor data, obtaining non-thermal sensor data, and determining, based on the thermal sensor data and the non-thermal sensor data, a perception parameter indicative of an object. Some methods described also include generating a trajectory for an autonomous vehicle. Systems and computer program products are also provided.

20 Claims, 12 Drawing Sheets
(4 of 12 Drawing Sheet(s) Filed in Color)

(56) References Cited

U.S. PATENT DOCUMENTS

| | | | |
|---|---|---|---|
| 6,799,087 B2 | 9/2004 | Estkowski | |
| 9,575,007 B2* | 2/2017 | Rao | G01N 25/72 |
| 9,813,643 B2* | 11/2017 | Terre | H04N 23/61 |
| 9,921,584 B2* | 3/2018 | Rao | B60W 10/20 |
| 10,732,260 B2* | 8/2020 | Ajanoh | G01S 13/931 |
| 10,809,910 B2* | 10/2020 | Iglesias | G06F 3/042 |
| 10,819,923 B1* | 10/2020 | McCauley | G01J 5/026 |
| 11,010,622 B2* | 5/2021 | Naser | G06V 20/58 |
| 11,192,734 B2 | 12/2021 | Kibler et al. | |
| 11,226,634 B2* | 1/2022 | Rao | B60W 30/10 |
| 11,284,022 B2* | 3/2022 | Zhang | H04N 13/106 |
| 11,735,099 B1* | 8/2023 | Wo | G01J 5/53 |
| | | | 345/82 |
| 11,741,716 B2* | 8/2023 | Radu | G01S 13/931 |
| | | | 701/27 |
| 11,780,471 B1* | 10/2023 | Beilouni | G06T 7/70 |
| | | | 701/26 |
| 11,906,657 B2* | 2/2024 | Preece | G06N 3/045 |
| 12,063,059 B2* | 8/2024 | Russell | H04W 4/20 |
| 12,200,572 B2* | 1/2025 | Russell | H04W 4/021 |
| 2004/0088079 A1* | 5/2004 | Lavarec | G01S 17/10 |
| | | | 700/258 |
| 2015/0358557 A1* | 12/2015 | Terre | H04N 23/21 |
| | | | 348/164 |
| 2016/0202199 A1* | 7/2016 | Rao | B61K 9/10 |
| | | | 250/340 |
| 2017/0160746 A1* | 6/2017 | Rao | B61L 3/06 |
| 2018/0120842 A1 | 5/2018 | Smith et al. | |
| 2018/0120852 A1* | 5/2018 | Cho | G05D 1/027 |
| 2018/0203459 A1* | 7/2018 | Rao | G05D 1/0246 |
| 2019/0064815 A1 | 2/2019 | Haynes | |
| 2019/0072645 A1* | 3/2019 | Ajanoh | G06N 3/084 |
| 2019/0146511 A1 | 5/2019 | Hurd et al. | |
| 2019/0294897 A1 | 9/2019 | Cohen et al. | |
| 2020/0103499 A1* | 4/2020 | Preece | G06N 3/04 |
| 2020/0104025 A1* | 4/2020 | Iglesias | G06F 3/04845 |
| 2020/0133295 A1 | 4/2020 | Indrakanti et al. | |
| 2020/0143179 A1* | 5/2020 | Naser | G06V 10/56 |
| 2020/0310753 A1* | 10/2020 | Radu | G06F 7/32 |
| 2020/0326720 A1* | 10/2020 | Rao | G05D 1/0246 |
| 2021/0152754 A1* | 5/2021 | McCauley | G01S 13/867 |
| 2021/0218814 A1 | 7/2021 | Tran | |
| 2022/0046194 A1* | 2/2022 | Zhang | H04N 13/106 |
| 2022/0185266 A1 | 6/2022 | Shah | |
| 2022/0214222 A1* | 7/2022 | Tauber | G06T 7/593 |
| 2022/0291701 A1* | 9/2022 | Posch | G08G 5/0091 |
| 2023/0217215 A1* | 7/2023 | Russell | H04W 48/16 |
| | | | 455/456.3 |
| 2023/0231591 A1* | 7/2023 | Russell | H04W 4/023 |
| 2024/0104765 A1* | 3/2024 | Babazaki | G06V 10/762 |

FOREIGN PATENT DOCUMENTS

| | | | | |
|---|---|---|---|---|
| CN | 113837217 A | * | 12/2021 | G06F 18/214 |
| SE | 1950963 A1 | | 3/2021 | |

OTHER PUBLICATIONS

Great Britain Office Action issued for Application No. GB 2201963. 2, dated Jul. 25, 2022.

Korean Office Action issued for Application No. KR 10-2022-0038904, dated Jan. 23, 2024.

Korean Office Action issued for Application No. KR 10-2022-0038904, dated Jul. 26, 2024.

Korean Office Action issued for Application No. KR 10-2022-0038904, dated Feb. 27, 2025.

* cited by examiner

THERMAL SENSOR DATA VEHICLE PERCEPTION

BACKGROUND

Autonomous vehicles can use a number of systems for determining agents which may affect a trajectory of the autonomous vehicle. However, autonomous vehicles have difficulty in determining, detecting, and/or tracking agents under certain conditions, and with respect to certain types of agents.

BRIEF DESCRIPTION OF THE FIGURES

The patent or application file contains at least one drawing executed in color. Copies of this patent or patent applicaiton publication with color drawing(s) will be provided by the Office upon request and payment of the necessary fee.

DETAILED DESCRIPTION

Figure 1:
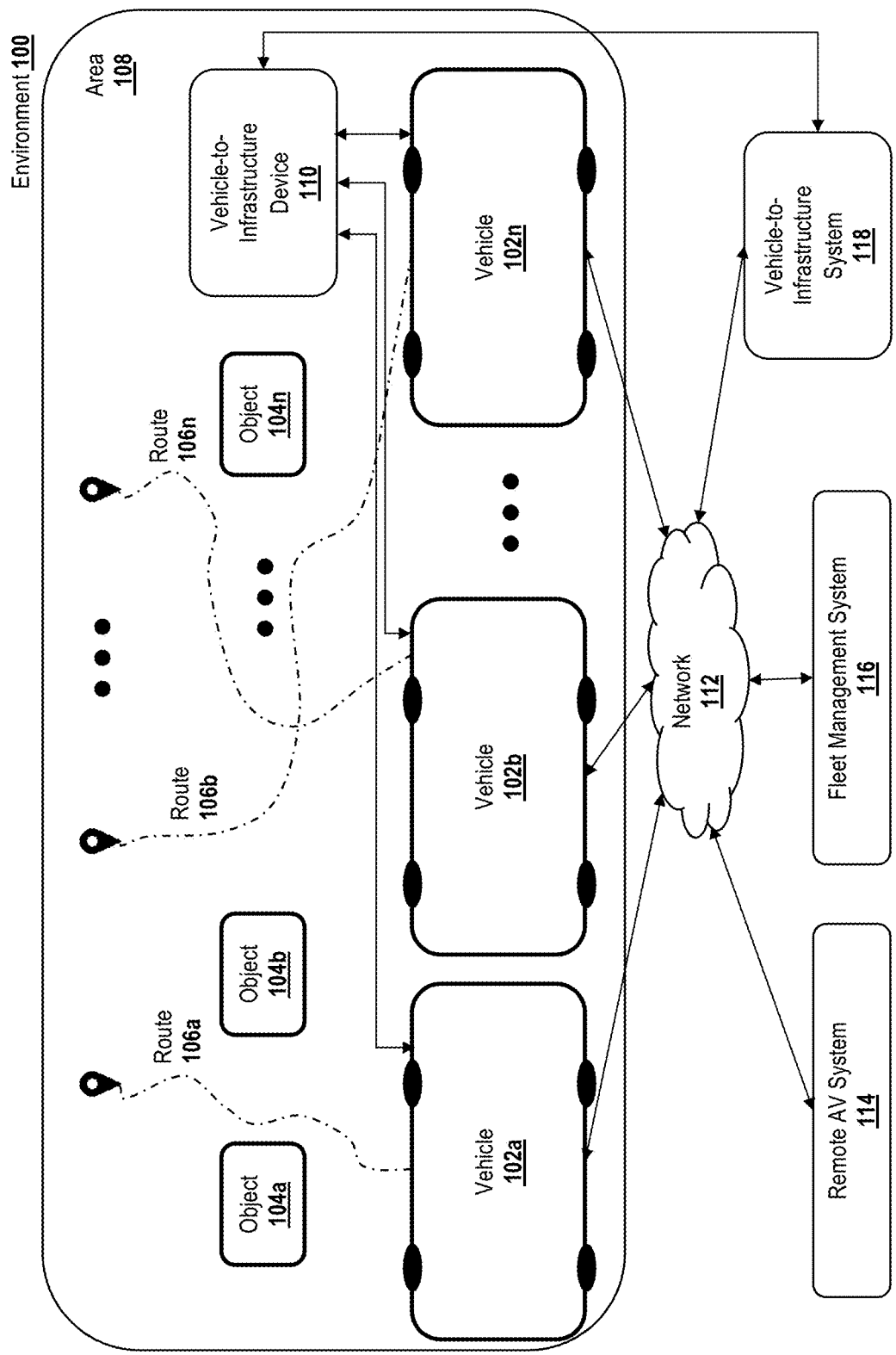
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

"At least one," and "one or more" includes a function being performed by one element, a function being performed by more than one element, e.g., in a distributed fashion, several functions being performed by one element, several functions being performed by several elements, or any combination of the above."

Some embodiments of the present disclosure are described herein in connection with a threshold. As described herein, satisfying a threshold, such as meeting a threshold, can refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement the use of thermal imaging in conjunction with non-thermal imaging for detection of agents in an environment in which an autonomous vehicle is operating.

By virtue of the implementation of systems, methods, and computer program products described herein, techniques for thermal sensor data vehicle perception can include improving the detection of objects which would otherwise be partly or completely occluded. A further advantage of systems, methods, and computer program products described herein include improved reaction time, such as by prioritizing heat emitting objects in the perception/prediction pipeline. Moreover, systems, methods, and computer program products described herein can allow for the differentiation of inactive and active objects, which can reduce processing requirements. By virtue of their implementation, the systems, methods, and computer program products described herein may lead to an improved accuracy of detection and improved speed of detection of objects and of reaction to the object detection.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
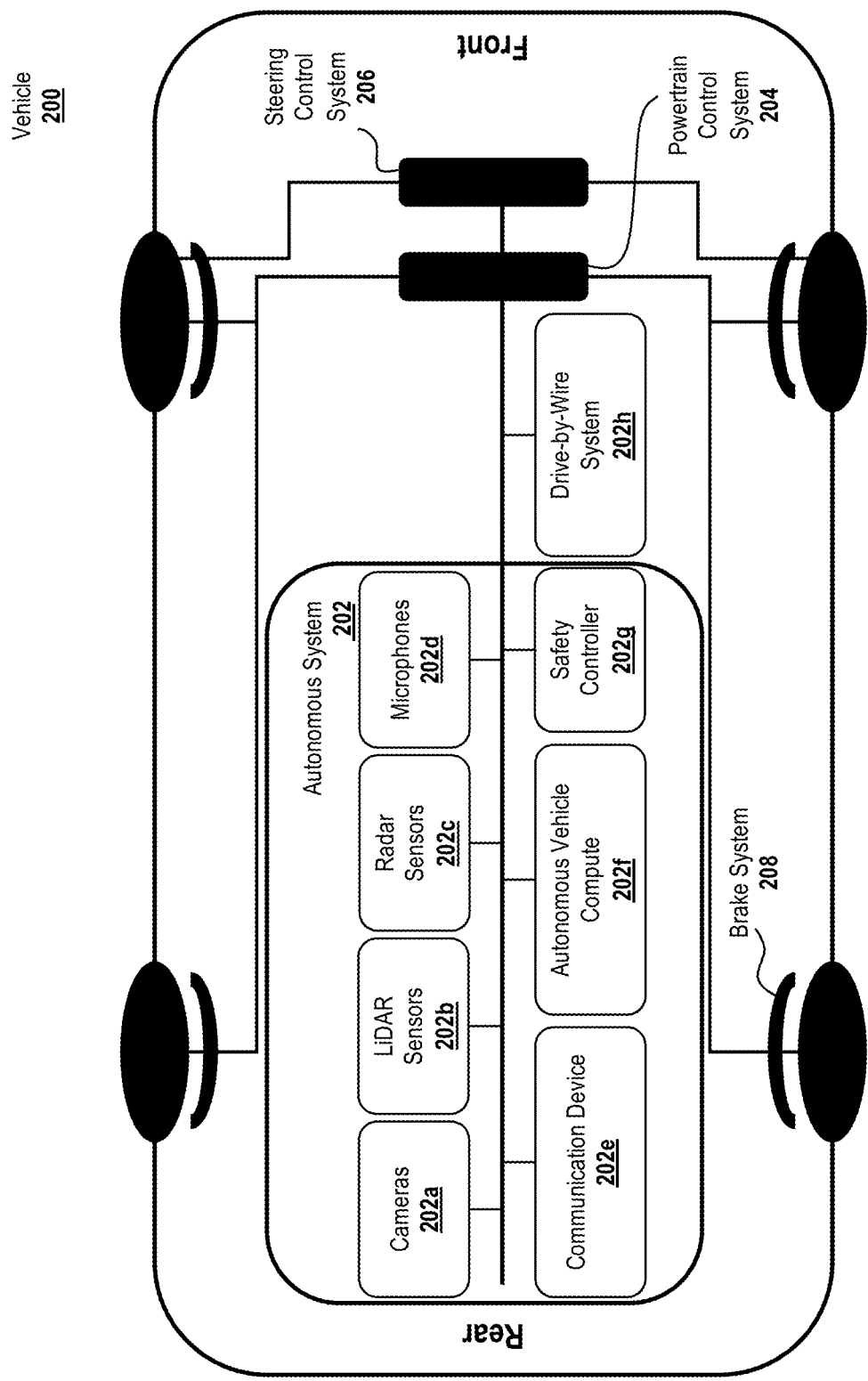
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 200 has autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and safety controller 202g.

Figure 3:
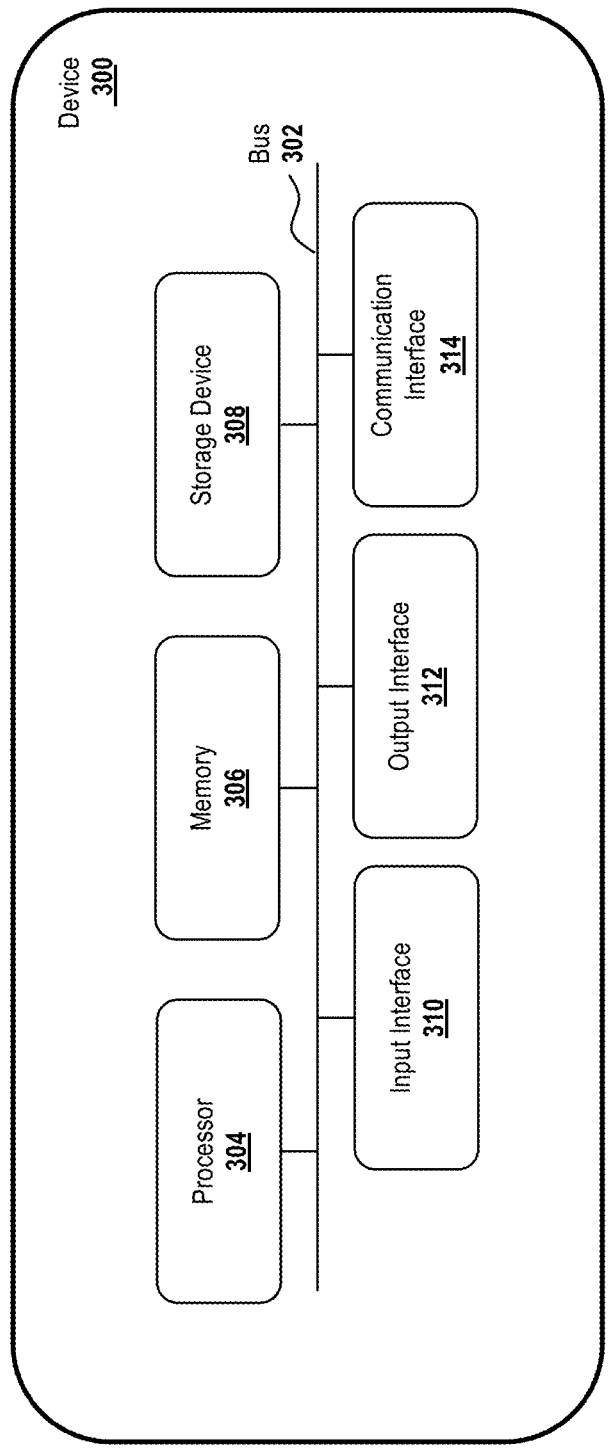
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202*a*, LiDAR sensors 202*b*, radar sensors 202*c*, microphones 202*d*, communication device 202*e*, safety controller 202*g*, and/or DBW system 202*h*. In some examples, autonomous vehicle compute 202*f* includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202*f* is the same as or similar to autonomous vehicle compute 400, described herein. Additionally, or alternatively, in some embodiments autonomous vehicle compute 202*f* is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202*g* includes at least one device configured to be in communication with cameras 202*a*, LiDAR sensors 202*b*, radar sensors 202*c*, microphones 202*d*, communication device 202*e*, autonomous vehicle computer 202*f*, and/or DBW system 202*h*. In some examples, safety controller 202*g* includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202*g* is configured to generate control signals that take precedence over (e.g., overrides) control signals generated and/or transmitted by autonomous vehicle compute 202*f*.

DBW system 202*h* includes at least one device configured to be in communication with communication device 202*e* and/or autonomous vehicle compute 202*f*. In some examples, DBW system 202*h* includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202*h* are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202*h*. In some examples, powertrain control system 204 includes at least one controller, actuator, and/or the like. In some embodiments, powertrain control system 204 receives control signals from DBW system 202*h* and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device of remote AV system 114, fleet management system 116, V2I system 118, and/or one or more devices of network 112 (e.g., one or more devices of a system of network 112). In some embodiments, one or more devices of vehicles 102 (e.g., one or more devices of a system of vehicles 102 such as at least one device of remote AV system 114, fleet management system 116, and V2I system 118, and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

Figure 8:
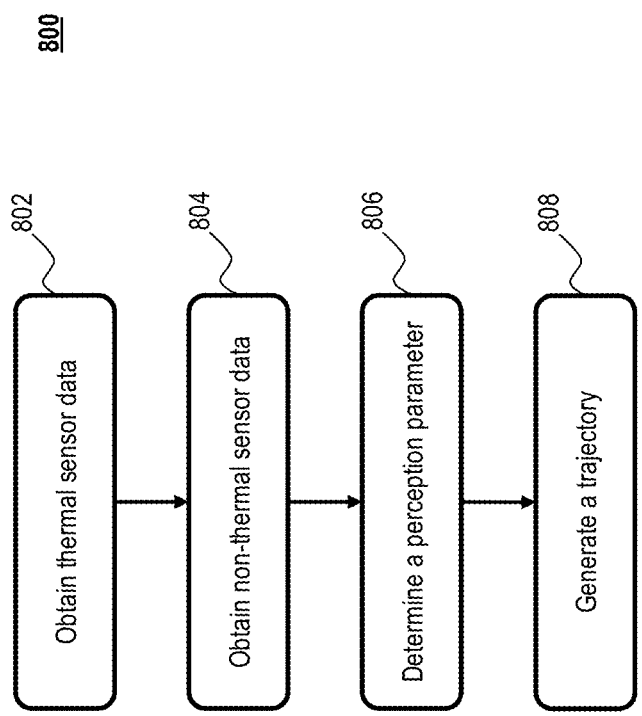
FIG. 8 is a flowchart of an example process for thermal sensor data vehicle perception.

In some embodiments, device 300 is configured to execute software instructions of one or more steps of the disclosed method, as illustrated in FIG. 8.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
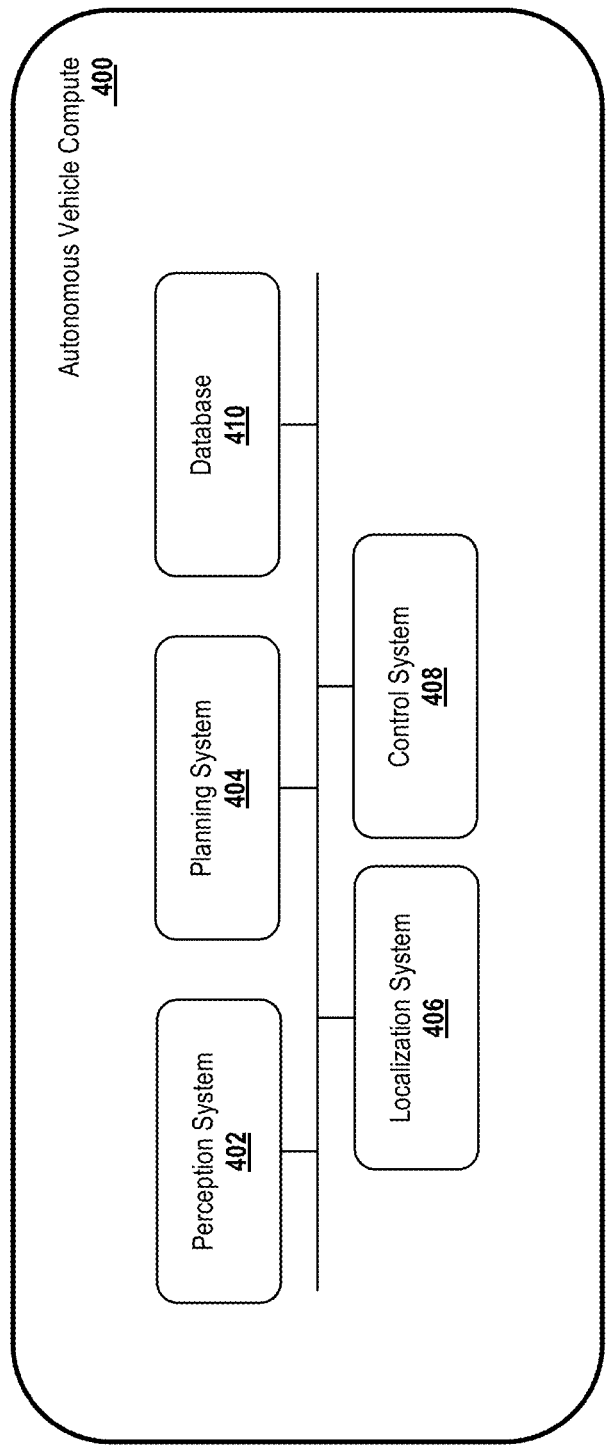
FIG. 4 is a diagram of certain components of an autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like).

In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like. In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 5A:
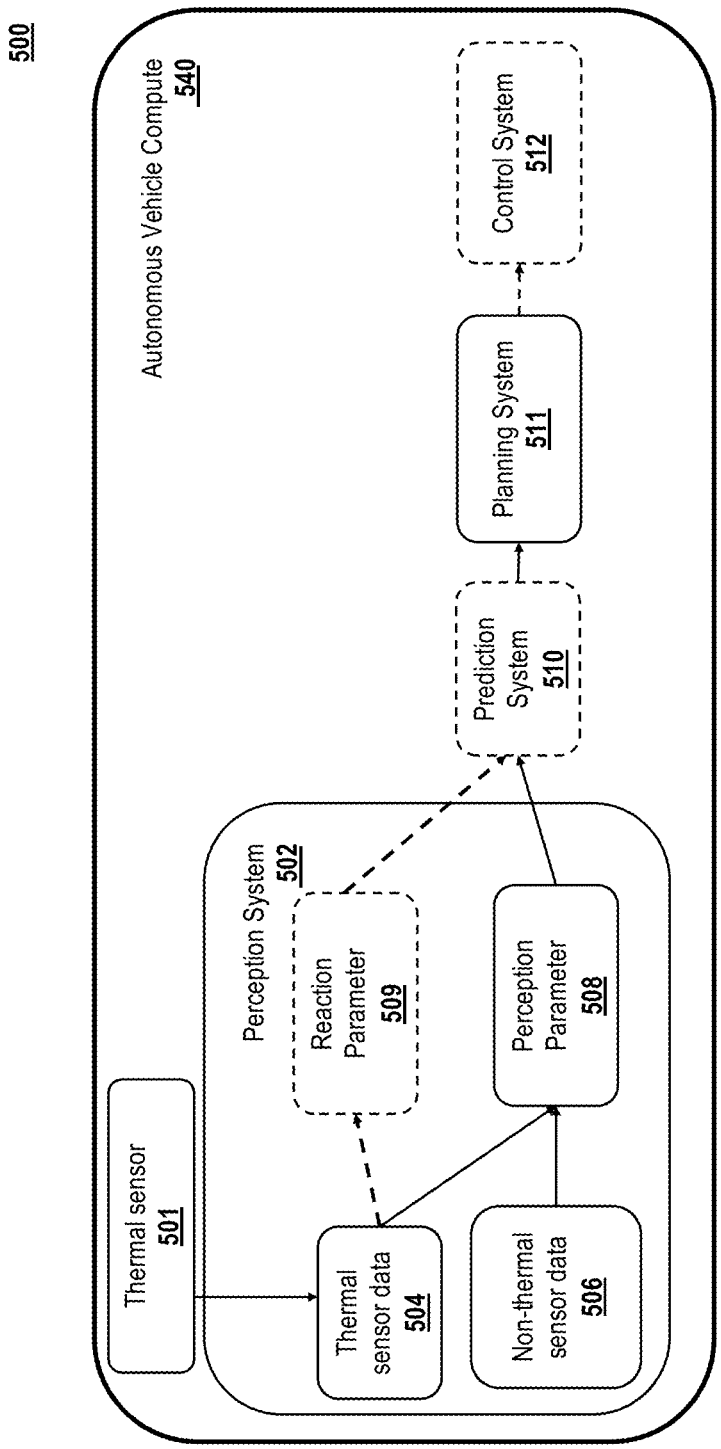
FIGS. 5A-5B are diagrams of an example implementation of a process for thermal sensor data vehicle perception.
Figure 5B:
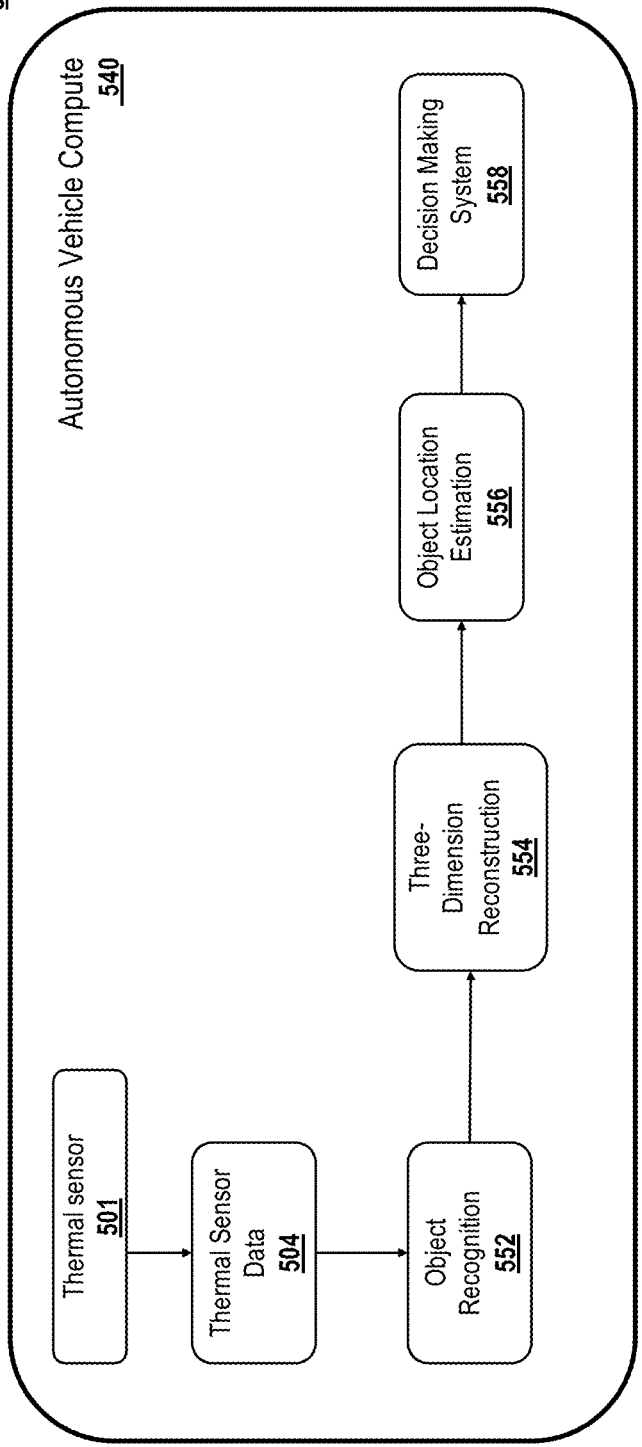

Referring now to FIGS. 5A-5B, illustrated are diagrams of an implementation 500 of a process for thermal sensor data vehicle perception. In some embodiments, implementation 500 includes an AV compute 540, and a vehicle (similar to vehicle 200 of FIG. 2, such as an autonomous vehicle). In some embodiments, implementation 500 is the same as or like system, such as an AV (e.g. illustrated in FIGS. 2, 3 and 4), an AV system, a remote AV system, a fleet management system, and a V2I system. The implementation 500, such as the system, can be for operating an autonomous vehicle. The implementation 500, such as the system, may not be for operating an autonomous vehicle.

The system 500 can provide for the use of thermal sensor data 504 for controlling an autonomous vehicle. For example, the system 500 can be configured for generating a trajectory for the autonomous vehicle. The thermal sensor data 504 may be used for inference of an object in an environment that the autonomous vehicle is driving in. In certain situations, autonomous vehicle perception which fuses only camera, LiDAR, RADAR and/or ultrasonic sensor data, may be limited with respect to object detection, identification, and/or behavior prediction. Accordingly, systems, methods, and computer program products disclosed herein, such as system 500, can incorporate thermal sensor data 504 for objects that may not be sensed and/or interpreted by the other sensors. Inferences can be made on the thermal sensor data 504 for planning and control the autonomous vehicle, either alone, or in conjunction with the other sensors.

The system 500 can be configured to obtain both thermal sensor data 504 and non-thermal sensor data 506 for determining a perception parameter indicative of an object. This can be particular advantageous in situations where non-thermal sensor data 506 may not be accurate, such as in low light conditions, such as at night or in tunnels, or during precipitation, such as rain and snow. Further conditions that may negatively affect non-thermal sensor data 506 include oncoming vehicles with headlights, such as high-beams causing glare, or glare from the sun. Further, non-thermal sensor data 506 may have difficulty in determining differences between objects close together. Moreover, animals, for example deer, may not be included in machine learning models using non-thermal sensor data 506. In these types of situations, non-thermal sensor data 506 may be degraded, but thermal sensor data 504 may not. Further, thermal sensor data 504 may be advantageous in a determination of whether an object is active, e.g. a determination of whether passengers in a stationary vehicle will disembark soon, or whether a stationary vehicle will begin moving.

Disclosed herein is a system 500. In one or more example systems, the system 500 can include at least one processor. In one or more example systems, the system 500 can include at least one memory storing instructions thereon that, when executed by the at least one processor, cause the at least one processor to obtain thermal sensor data 504 associated with an environment in which an autonomous vehicle is operating. In one or more example systems, the system 500 can include at least one memory storing instructions thereon that, when executed by the at least one processor, cause the at least one processor to obtain non-thermal sensor data 506 associated with the environment. In one or more example systems, the system 500 can include at least one memory storing instructions thereon that, when executed by the at least one processor, cause the at least one processor to determine, based on the thermal sensor data 504 and the non-thermal sensor data 506, a perception parameter indicative of an object in the environment. In one or more example systems, the system 500 can include at least one memory storing instructions thereon that, when executed by the at least one processor, cause the at least one processor to generate, based on the perception parameter, a trajectory for the autonomous vehicle.

Disclosed herein is a system 500. In one or more example systems, the system 500 can include at least one processor. In one or more example systems, the system 500 can include at least one memory storing instructions thereon that, when executed by the at least one processor, cause the at least one processor to obtain thermal sensor data 504 associated with an environment in which an autonomous vehicle is operating. In one or more example systems, the system 500 can include at least one memory storing instructions thereon that, when executed by the at least one processor, cause the at least one processor to determine, based on the thermal sensor data 504, a perception parameter indicative of an object in the environment. In one or more example systems, the system 500 can include at least one memory storing instructions thereon that, when executed by the at least one processor, cause the at least one processor to generate, based on the perception parameter, a trajectory for the autonomous vehicle.

The system 500 can be configured to obtain thermal sensor data 504 and/or non-thermal sensor data 506, such as in perception system 502, which can include any or all components of perception system 402 of FIG. 4.

Advantageously, as shown in FIG. 5A, the system 500 can be configured to obtain thermal sensor data 504 and non-thermal sensor data 506, such as in perception system 502, which can include any or all components of perception system 402 of FIG. 4. The system 500 can be configured to fuse, such as combine, such as make determinations on, both thermal sensor data 504 and non-thermal sensor data 506. It may be advantageous for the system 500 to obtain thermal sensor data 504 for segmenting different objects, as two objects rarely have the same temperature. For example, a car and a pedestrian, or an animal and a tree, which may be difficult for a system 500 to determine using non-thermal sensor data 506 alone, for example in certain physical conditions. In certain implementations, the system 500 may only obtain thermal sensor data.

An object may be seen as a physical object present in the environment of the autonomous vehicle, such as in a proximate environment of the autonomous vehicle. Examples of object include a pedestrian, a cyclist, a motorcyclist, a vehicle, an animal, infrastructure equipment (such as a light pole, traffic light equipment), a surface (such as a driving surface, such as a road, such as tracks). An object may be interpreted as an agent by the system 500. An agent may be seen as an object capable of dynamic behavior, such as dynamic movement in space. The environment in which the AV operates may include one or more objects.

Thermal sensor data 504 can be indicative of a temperature of an object, such as a portion or section of an object. For example, thermal sensor data 504 can be indicative of heat of an object such as of a portion or section of an object. Thermal sensor data 504 can include infrared data. Thermal sensor data 504 can be indicative of infrared waves from an object such as from a portion or section of an object. The thermal sensor data 504 can be indicative of a gradient of heat of an object.

The thermal sensor data 504 can be obtained from one or more sensors, such as a first sensor, such as an onboard sensor, such as a thermal sensor 501. The first sensor may be associated with the autonomous vehicle. An autonomous vehicle may include one or more sensors that can be configured to monitor an environment where the autonomous vehicle operates, such as through such as a thermal sensor 501 for provision of thermal sensor data 504. For example, the monitoring can provide thermal sensor data 504 indicative of what is happening in the environment around the autonomous vehicle, such as for generating trajectories of the autonomous vehicle. Thermal sensors can include one or more of the sensors illustrated in FIG. 2.

The thermal sensor data 504 may be real-time thermal sensor data, such as live thermal sensor data. The thermal sensor data 504 may be real-time thermal sensor data, such as thermal sensor data 504 received in real-time. The thermal sensor data 504 may be thermal sensor data. The system 500 may obtain thermal sensor data 504 from 360 degrees and/or from a front field of view. The particular scope is not limiting.

In one or more example systems, the thermal sensor data 504 can be obtained from a thermal sensor 501. The thermal sensor 501 can include one or more of: a thermal camera and an infrared thermal sensor. The system 501 can include the thermal sensor 501.

For example, system 500 can be configured to obtain thermal sensor data 504 from a thermal sensor 501. The thermal sensor 501 can include one or more of: a thermal camera and an infrared thermal sensor. The thermal sensor data 504 can be obtained, by the system 500, from an infrared sensor. The system 500 can be configured to obtain infrared waves as thermal sensor data 504.

In one or more example systems, the thermal sensor data 504 can be one or more of: thermal sensor data 504 of the object and thermal sensor data 504 of a reflection of the object.

Advantageously, a thermal sensor, such as in system 500, can be used to detect, such as obtain, thermal sensor data 504 from an object itself and/or a reflection of an object on a second object. For example, a warm body object (WBO) can produce a thermal reflection, such as via reflection of infrared waves, on a nearby object, such as a window, glass, metal, and/or plastic. The system 500 can perform spatial reasoning based on reflection indicated in the thermal sensor data on a surface, e.g. glass. The system 500 can be configured to obtain the thermal sensor data 504 from the warm body object and/or from the reflection of the warm object, such as on the window. The system 500 may be able to advantageously obtain thermal sensor data 504 of an object which may be occluded for non-thermal sensor data 506.

The system 500 can be further configured to obtain non-thermal sensor data 506 associated with the environment an autonomous vehicle is driving in.

Non-thermal sensor data 506 may not be indicative of a temperature of an object, such as a portion or section of an object. For example, non-thermal sensor data 506 may not be indicative of heat of an object. Non-thermal sensor data 506 may not be infrared data. Non-thermal sensor data 506 may not be indicative of infrared waves. Non-thermal sensor data 506 may be any sensor data that is not thermal sensor data 504.

The non-thermal sensor data 506 can be obtained from one or more sensors, such as a second sensor, such as an onboard sensor. The second sensor may be associated with the autonomous vehicle. An autonomous vehicle may include one or more sensors that can be configured to monitor an environment where the autonomous vehicle operates, such as through non-thermal sensor data 506. For example, the monitoring can provide non-thermal sensor data 506 indicative of what is happening in the environment around the autonomous vehicle, such as for generating trajectories of the autonomous vehicle. Non-thermal sensors can include one or more of the sensors illustrated in FIG. 2.

The non-thermal sensor data 506 may be live non-thermal sensor data. The non-thermal sensor data 506 may be real-time non-thermal sensor data, such as non-thermal sensor data 506 received in real-time. The non-thermal sensor data 506 may be active non-thermal sensor data.

In one or more example systems, the non-thermal sensor data 506 can be obtained from one or more of: an image sensor, a Light Detection and Ranging (LiDAR) sensor, a RADAR sensor, and an ultrasonic sensor.

The system 500 can be configured to obtain non-thermal sensor data 506 from one or more of: an image sensor, a Light Detection and Ranging (LiDAR) sensor, a RADAR sensor, and an ultrasonic sensor However, other non-thermal sensors can be used as well by the system 500 for obtaining non-thermal sensor data 506. For example, an image sensor can be a camera.

The system 500 can be configured to determine, based on the thermal sensor data 504 and the non-thermal sensor data 506, a perception parameter. The system 500 can be configured to determine, based on the thermal sensor data 504 and/or the non-thermal sensor data 506, a perception parameter. The system 500 can determine the perception parameter such as in, for example, perception system 502 shown in FIG. 5A. The perception parameter can be indicative of an object in the environment, such as an object in the environment that the autonomous vehicle is operating. The perception parameter can be indicative of a presence of an object. The perception parameter can be indicative of a potential object. The system 500 can be configured to determine, based on the thermal sensor data 504 and/or the non-thermal sensor data 506, the perception parameter which indicates the presence of an object and/or a possible presence of an object.

The system 500 can be configured to determine the perception parameter by combining and/or fusing thermal sensor data 504 and non-thermal sensor data 506. For example, the system 500 can be configured to overlay thermal sensor data 504 on non-thermal sensor data 506, or vice-versa. The system can be configured to determine the perception parameter by not-fusing thermal sensor data 504 and non-thermal sensor data 506, such as by keeping the thermal sensor data 504 and the non-thermal sensor data 506 separate.

The system 500 can be configured to generate a trajectory of the autonomous vehicle based on the perception parameter, such as in planning system 511, which can include any and all of the components of planning system 404.

The system 500 can be configured to operate, such as control, the autonomous vehicle based on the generated trajectory. For example, the system 500 can operate the autonomous vehicle using control system 512, which may include any and all components of control system 408.

An object may be seen as anything that the system 500 can detect in the environment. An object may be a physical object. Examples of objects include agents, infrastructure, animals, cars, people, roads, conditions of roads, and tracks. The system 500 can perform reasoning on tracks of objects based on the thermal sensor data (e.g. other cars in snow for the AV orientation). However, the particular type of object is not limiting.

In one or more example systems, the object can be an agent. In one or more example systems, the object may not be an agent.

An agents can be a physical object located in the environment. Agents can include all or some physical objects located in the environment. The type of agent can be set by a system or a user. The type of agent can be determined automatically, such as through sensing and machine learning. Example agents include, but are not limited to, road users, such as other vehicles, animals, road users, pedestrians, and bikers. In one or more example systems, an agent of the plurality of agents can include an object capable of a dynamic movement over time. An agent can be any object that is captured by a sensor, or included in a sensor data, such as the thermal sensor data 504 and/or the non-thermal sensor data 506.

In one or more example systems, the instructions, when executed by at least one processor, can cause the at least one processor to determine, based on the thermal sensor data and the perception parameter, one or more segments of the object.

For example, the system 500 can be configured to determine portions, such as sections or segments, of the object.

In one or more example systems, the object can be a driving surface.

For example, the driving surface can be a road. The system 500 can determine a perception parameter indicative of a driving surface. The system 500 can determine a perception parameter indicative of a condition of a driving surface, such as a road condition. Road conditions can include one or more of ice patches, snow patches, and water.

For example, a vehicle driving through the snow would leave tire tracks in the snow. The structure and angle of the tire tracks can affect the amount of thermal, such as infrared, energy given off. The system 500 can be configured to obtain thermal sensor data 504 indicative of the tracks and determine a perception parameter indicative of the tracks.

The system 500 can generate a trajectory based on the perception parameter indicative of a driving surface, such as by following the driving surface for orientation of the autonomous vehicle on the driving surface.

The system 500 can be configured to determine a perception parameter indicative of a track, such as an animal track, such as a pedestrian track.

In one or more example systems, the perception parameter can be indicative of a feature of the object.

For example, the system 500 may be configured to determine a perception parameter indicative of a feature of an object. The system 500 can be configured to reduce an object to one or more features, such as indicated by the perception parameter. A feature may be indicative of a part, such as a portion, of an object.

A feature may characterize an object. A feature may characterize an object in space. A feature may characterize an object geometrically. A feature may characterize an object functionally.

A feature may be indicative of a type of vehicle. For example, the system 500 can determine a perception parameter indicative of a type of vehicle. The system 500 can be configured to determine different aspects, such as configurations, based on the type of vehicle, such as engine performance, acceleration performance, and/or deceleration performance. The system 500 can be configured to generate the trajectory based on the aspects of the type of vehicle.

A feature may indicate the type of objects to which the object belongs, such as living object type and/or non-living object type. This can make feature-based tracking easier than in a daylight camera, such as providing non-thermal sensor data 506.

In one or more example systems, the feature is one or more of: a light, a doorknob, a window frame, and a window. In one or more example systems, when the object is a vehicle, the feature can be one or more of: a light of the vehicle, a doorknob of the vehicle, a window frame of the vehicle, and a window of the vehicle. The system 500 can perform reasoning on light states based on reflection indicated in the thermal sensor data on a surface, e.g. traffic lights vs vehicle lights. Other components of an object can be a feature as well, and the particular type of feature is not limiting.

The feature can be a component of an object that would be indicative of by thermal sensor data 504. For example, the system 500 can determine a perception parameter of a hot engine, a recently turned off light, a recently touched door handle, etc. While a remainder of an object may not be indicated by thermal sensor data 504, the system 500 may be configured to determine a perception parameter of a feature of the object.

The system 500 can be configured to determine a perception parameter of an object based on the feature. For example, the system can be configured to determine a perception parameter of a car based on a hot wheel, even if the thermal sensor data 504 is not indicative of the entire car.

In one or more example systems, the perception parameter can be indicative of a state of the object.

For example, a state of the object may be indicative of an activity of the object, such as an activity level of the object. A state of the object may be indicative of a potential activity of the object. The state of the object may be indicative of the object being active. The state of the object may be indicative of the object being not active, such as inactive.

As certain non-limiting examples, the system 500 may be configured to determine a perception parameter indicative of the object being inactive stationary. An inactive stationary object may be, for example, a turned-off car parked on the side of a road. The system 500 can obtain thermal sensor data 504 that is indicative of the object being inactive stationary, as a turned-off parked car would not provide any thermal energy. The system 500 may also can obtain non-thermal sensor data 506 that is indicative of the object, such as indicative of the object being stationary, e.g. not being in motion. The system 500, based on the obtained thermal sensor data 504 and non-thermal sensor data 506, can then determine the perception parameter to be indicative of the object being inactive stationary.

As certain non-limiting examples, the system 500 may be configured to determine a perception parameter indicative of the object being active stationary. An active stationary object may be, for example, a turned-on car parked on the side of a road. The system 500 can obtain thermal sensor data 504 that is indicative of the object, as a turned-on parked car would provide thermal energy. The system 500 may also obtain non-thermal sensor data 506 that is indicative of the object, such as indicative of the object being stationary, e.g. not being in motion. The system 500, based on the obtained thermal sensor data 504 and non-thermal sensor data 506, can then determine the perception parameter to be indicative of the object being active stationary. This may be advantageous in that the system 500 can predict or anticipate an action by the active stationary object, such as unloading of passengers, and/or about to pull out of a side of a road.

As certain non-limiting examples, the system 500 may be configured to determine a perception parameter indicative of the object being active moving. An active moving object may be, for example, a moving car. The system 500 can obtain thermal sensor data 504 that is indicative of the object, as a moving car would provide thermal energy. The system 500 may also obtain non-thermal sensor data 506 that is indicative of the object, such as indicative of the object being in motion. The system 500, based on the obtained thermal sensor data 504 and non-thermal sensor data 506, can then determine the perception parameter to be indicative of the object being active moving.

For example, the system 500 can determine the perception parameter indicative of the state of the object by inferring, based on thermal sensor data 504, the state of the object. Thermal sensor data 504 can be indicative of vehicles, such as one or more of: a warm cabin, a cooled cabin, engine heat status, exhaust fumes, hot wheels, hot lights, hot mirrors.

The system 500 can be configured to generate a trajectory based on the perception parameter being indicative of the state of the object. For example, the system 500 may determine a perception parameter indicative that an object, such as a vehicle, is active stationary, and may generate a trajectory of the autonomous vehicle further away from the object as the object may pose a risk of driving off or passengers disembarking.

In one or more example systems, the instructions, when executed by at least one processor, can cause the at least one processor to predict, based on the perception parameter, an object trajectory of the object. In other words, the system 500 can predict, (using a prediction system 510) based on the perception parameter, an object trajectory of the object.

For example, the system 500 can be configured to perform and/or apply a prediction scheme based on the perception parameter. The system 500 can perform the prediction, for example, in prediction system 510. The system 500 can be configured to predict, such as based on a probability, an action of an object indicated by the perception parameter. Example actions are movement, speed, direction, and acceleration. For example, the system 500 can be configured to determine an interaction parameter indicative of a prediction of an object indicated by the perception parameter with the autonomous vehicle. The interaction parameter may be a probability of interaction. The interaction parameter may be indicative of dimensions of an object, such as speed and/or direction.

The interaction parameter may be indicative of interaction of the object indicated by the perception parameter for the trajectory of the autonomous vehicle, e.g., due to potential interaction, potential conflict, potential collision. For example, the interaction parameter may indicate a potential future interaction of the object indicated by the perception parameter with the autonomous vehicle, such as a predicted interaction, such as a probability of the object interacting with the autonomous vehicle. For example, the interaction parameter may indicate prediction of a level of interaction of the object indicated by the perception parameter interacting with the autonomous vehicle.

Further, the system 500 can be configured to perform a projection scheme of the object. While the system 500 may predict where an object indicated by the perception parameter is likely to go (such as will go), the system can be configured to 500 to actually project where the object indicated by the perception parameter is likely to go (such as will go). The system 500 can determine the interaction parameter based on the prediction scheme and/or the projection scheme.

In one or more example systems, the system 500 can be configured to determine a location of an object, such as shown in FIG. 5B. For example, the system 500 may determine, such as estimate, the location of an object in accordance with the system 500 determining a perception parameter indicative of a reflection of an object. As the object itself may be occluded from the sensors of the autonomous vehicle, it can be advantageous for the system 500 to determine a location of the object from the reflection indicated by the perception parameter. The system 500 can be configured to predict an object trajectory based on the perception parameter being indicative of a reflection of an object.

For example, the system 500 can obtain thermal sensor data 504 which can be indicative of an object and can determine a perception parameter of the object, thereby performing object recognition 552. For example, the thermal sensor data 504 may be indicative of a reflection of the object. The system 500 can be configured to perform a three-dimension reconstruction (e.g. via three-dimension reconstruction system 554) of the object based on the thermal sensor data 504. A three-dimension reconstruction may be seen as a three-dimension representation. Based on the three-dimension reconstruction (e.g. via three-dimension reconstruction system 554, the system 500 can be configured to estimate a location of the object, e.g. via an object location estimation system 556. The system 500 can be configured to apply, based on the thermal sensor data and/or the non-thermal sensor data, reverse ray tracing to determine a location of an object.

Based on the estimated location of the object, via an object location estimation system 556, the system can be configured to perform a decision making system (e.g. via a decision making system 558), which can include, for example, prediction system 510, planning system 551, and/or control system 512 of FIG. 5A. The decision making system 508 can be configured to predict a trajectory of the AV, and optionally to generate and validate a trajectory, such as for safety.

The system 500 can be configured to predict, such as estimate and/or generate, an object trajectory. The system 500 can be configured to predict the object trajectory based on the object itself, or based on an estimated location of the object.

In one or more example systems, to predict the object trajectory can include to overlay, based on the perception parameter, a representation of the thermal sensor data 504 on a three-dimension reconstruction of the object. In one or more example systems, to predict the object trajectory can include to estimate, based on the perception parameter, a location of the object. In one or more example systems, to predict the object trajectory can include to predict, based on the estimated location, the object trajectory of the object.

For example, the system 500 can overlay, such as combine or fuse, a representation of the obtained thermal sensor data 504 on a three-dimension reconstruction of the object. The system 500 can be configured to generate a three-dimension reconstruction of the object, e.g. using a three-dimension reconstruction system 554. For example, the system 500 may be configured to access a database with predetermined objects, and the system 500 can be configured to compare the thermal sensor data 504 with the database for generating a three-dimension reconstruction of the object. The system 500 can be configured to generate a three-dimension reconstruction of the object based on the obtained thermal sensor data 504 and/or the obtained non-thermal sensor data 506.

A reconstruction may be a shape of the object. A reconstruction may be an approximate shape of the object.

For example, the system 500 can overlay and/or fuse one or more pixels obtained for the daylight camera and the thermal sensor to generate an image, and can insert the image into an image segmentation network (such as a neural network).

For example, the system 500 can treat separately a first image obtained for the daylight camera and a second image obtained from the thermal sensor (as a multidimensional image), and can insert the first and the second image into a dual image segmentation network (such as a neural network).

The system 500 can be configured to predict an object trajectory of the object. For example, the system 500 can estimate the location of the object. This may be advantageous if the object is occluded or not occluded.

The system 500 may be configured to predict the object trajectory. For example, the system 500 can be configured to predict the object trajectory based on the estimated location and/or the perception parameter, which may be indicative of motion of the object.

In one or more example systems, to generate the trajectory for the autonomous vehicle can include to generate, based on the object trajectory, the trajectory for the autonomous vehicle.

For example, the system 500 can be configured to predict, such as determine and/or estimate, an object trajectory of the object. The system 500 can be configured to generate the trajectory for the autonomous vehicle so that the trajectory of the autonomous vehicle does not intersect with the object trajectory of the object. Advantageously, the system 500 can then be configured to avoid the object, improving autonomous vehicle safety.

In one or more example systems, the system 500 can be configured to determine a second trajectory of the autonomous vehicle, such as in planning system 511, based only on the thermal sensor data 504, for example by allowing for a quick reaction. The system 500 can be configured to determine the second trajectory instead of the trajectory. This can be known as a quick reaction.

A quick reaction may be advantageous in situations with hard-to-classify objects for the system 500, such as an animal, and/or a concealed or partially concealed object. The system 500 determining a perception parameter from both thermal sensor data 504 and non-thermal sensor data 506 may take too long for reaction. In certain example systems, the system 500 may only use thermal sensor data 504, such as for determining a second trajectory. The system 500 can be configured to generate the second trajectory and immediately react the autonomous vehicle, such as by controlling the autonomous vehicle, such as by using control system 512.

In one or more example systems, the instructions, when executed by at least one processor, cause the at least one processor to determine, based on the thermal sensor data 504, a reaction parameter 509 for an emergency reaction. In one or more example systems, the instructions, when executed by at least one processor, cause the at least one processor to generate, based on the reaction parameter 509, a second trajectory for the autonomous vehicle.

For example, the system 500 may not need to determine the perception parameter in order to generate the second trajectory. For example, system 500 can obtain thermal sensor data 504 indicative of an object, such as a source of heat, moving towards the autonomous vehicle or its path. The system 500 can be configured to determine a second trajectory, such as indicative of immediately decelerating. This action can be performed without non-thermal sensor data 506 such as without determining a perception parameter indicative of the object.

For example, the system 500 can be configured to determine a reaction parameter 509. The reaction parameter 509 may be used for, such as indicative of, an emergency action for the autonomous vehicle. The system 500 may be configured to determine the reaction parameter 509 based on only thermal sensor data 504, and not non-thermal sensor data 605, indicative of an object moving towards the autonomous vehicle.

The second trajectory may be different from the trajectory. The second trajectory may be indicative of decelerating the autonomous vehicle. The second trajectory may be indicative of accelerating the autonomous vehicle. The second trajectory may be indicative of changing direction of the autonomous vehicle.

The system 500 can be configured to determine the reaction parameter 509 based on a criterion. The criterion may be, for example, an object indicated by the thermal sensor data 504 as moving towards the autonomous vehicle. The criterion may be, for example, an object indicated by the thermal sensor data 504 as moving towards the autonomous vehicle at a rate greater than a speed threshold.

Upon determining that the thermal sensor data 504 is indicative of the object moving towards the autonomous vehicle, the system 500 can determine that the thermal sensor data 504 meets the criterion. Upon determining that the thermal sensor data 504 is indicative of the object moving towards the autonomous vehicle at or above the speed threshold, the system 500 can determine that the thermal sensor data 504 meets the criterion.

Upon determining that the thermal sensor data 504 is not indicative of the object moving towards the autonomous vehicle, the system 500 can determine that the thermal sensor data 504 does not meet the criterion. The system 500 can then proceed to the determination of the perception parameter. Upon determining that the thermal sensor data 504 is indicative of the object moving towards the autonomous vehicle below the speed threshold, the system 500 can determine that the thermal sensor data 504 does not meet the criterion.

In one or more example systems, to generate the trajectory for the autonomous vehicle can include to prioritize, based on the perception parameter, the object.

For example, the system 500 can be configured to prioritize objects, such as agents, in the environment. The system 500 can be configured to determine a priority parameter for every object in the environment indicated by the perception parameter.

The system 500 can be configured to determine an order of objects indicated by the perception parameter based on the priority parameter. For example, the system 500 can be configured to order a set of objects indicated by the perception parameter in an environment based on the priority parameter.

The system 500 can be configured to determine a priority parameter indicative of a higher priority for an object indicated by the thermal sensor data 504 than an object indicated by only the non-thermal sensor data 506. The system 500 can be configured to prioritize WBOs, such as those indicated by the thermal sensor data 504, for generation of the trajectory for the autonomous vehicle. Advantageously, the system 500 prioritization can improve safety of the autonomous vehicle, as it can allow the system 500 to make sure to avoid WBOs first. This can prevent injury or harm to pedestrians around the autonomous vehicle.

FIGS. 6A-6G are thermal images for use in an example implementation of a process for thermal sensor data vehicle perception, such as discussed with respect to system 500 of FIGS. 5A-5B.

Figure 6B:
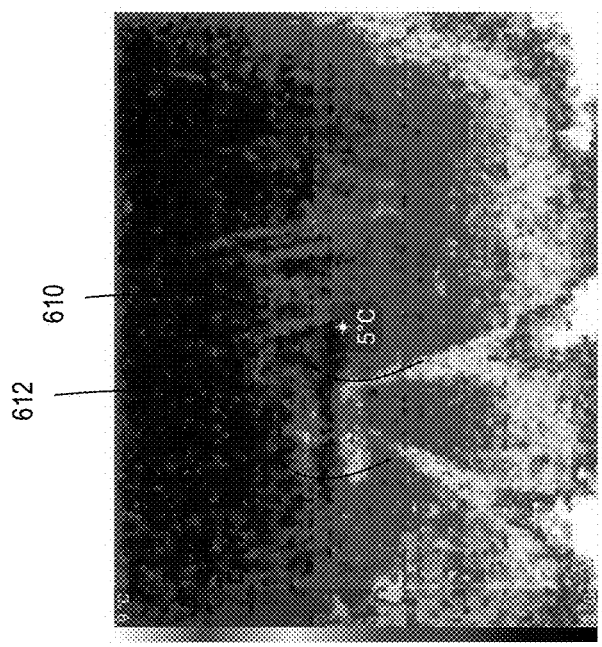
FIGS. 6A-6G are thermal images for use in an example implementation of a process for thermal sensor data vehicle perception.
Figure 6A:
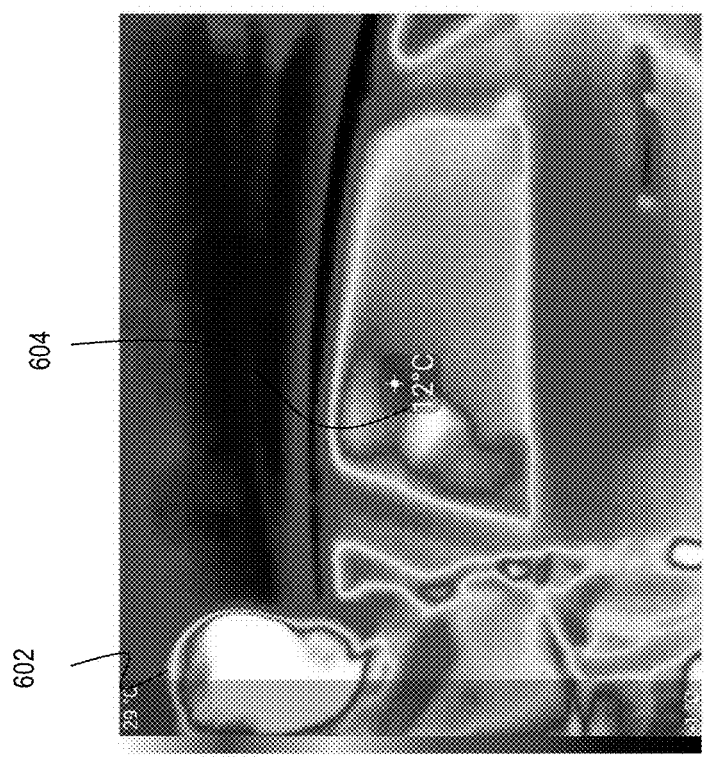

FIG. 6A illustrates how a system 500 can obtain thermal sensor data 504 indicative of an object 602 and/or the reflection 604 of the object. The system 500 can then determine a perception parameter indicative of the object 602 and/or the reflection 604 of the object.

FIG. 6B illustrates how a system 500 can obtain thermal sensor data 504 indicative of a driving surface 608. As shown, the driving surface 608 can have a first heat signature 610 indicated by the thermal sensor data 504 and a second heat signature 612 indicated by the thermal sensor data 504. For example, the system can determine one or more ambient heat sources that reveal a shape of tracks (e.g. in snow, ice) and other road obstacles.

Figure 6D:
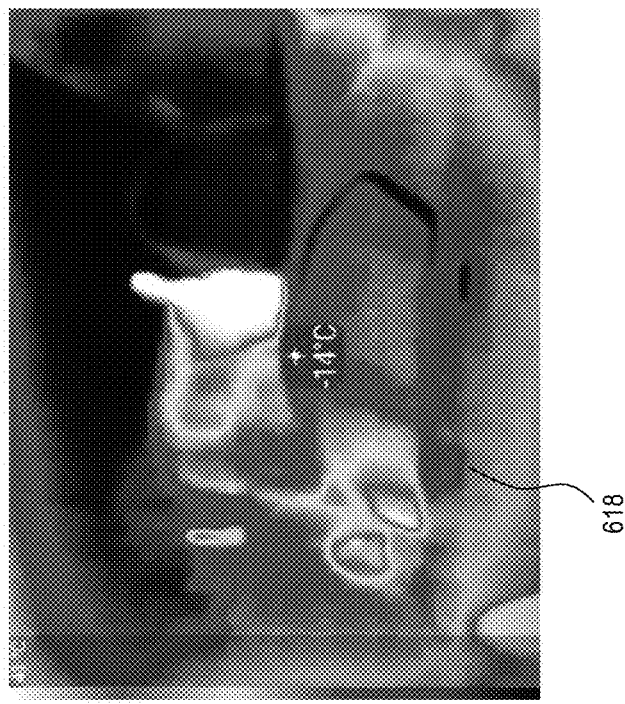
Figure 6C:
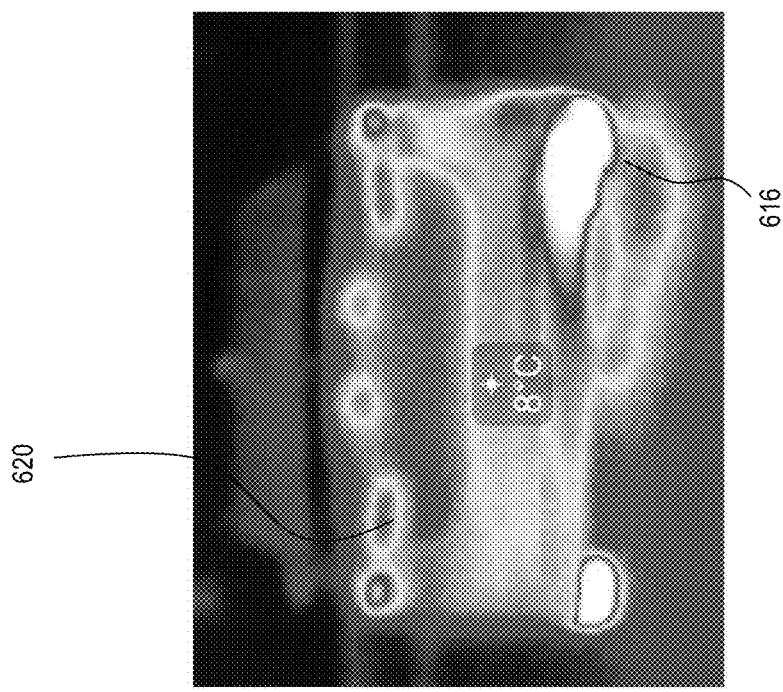

FIGS. 6C-6D illustrate how a system 500 can obtain thermal sensor data 504 indicative of an object, and how the system 500 can determine a perception parameter indicate of a feature of the object. For example, the feature can be a headlight 616, a doorknob 618, and/or other lights 620. The system 500 may be configured to determine a perception parameter indicative of an entire vehicle based on the feature, such as the headlight 616. For example, This makes feature-based tracking easier than using daylight camera. The type of vehicle could also be easier to infer (e.g. which engine, which acceleration/deceleration performance).

Figure 6F:
Figure 6E:
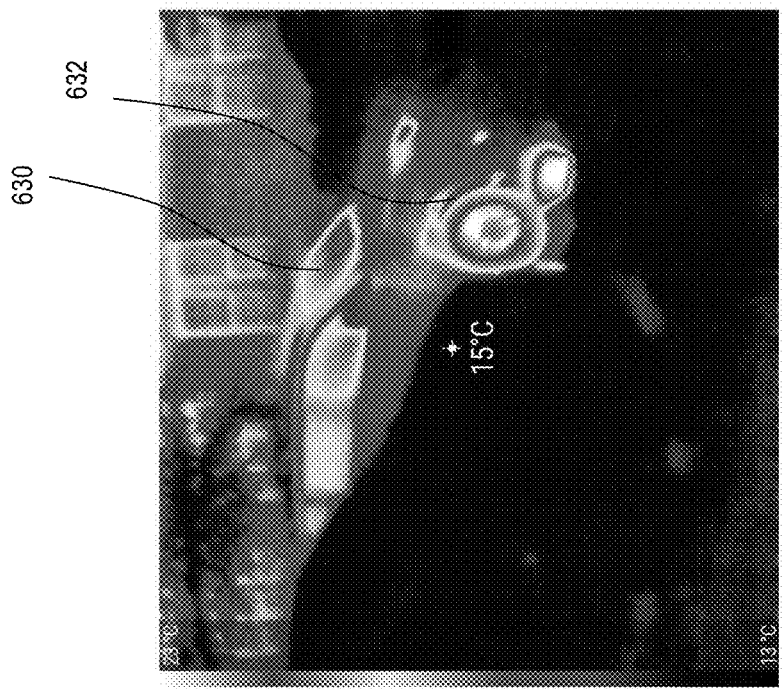
Figure 6G:

FIGS. 6E-6G illustrate how a system 500 can obtain thermal sensor data 504 indicative of an object, and how the system 500 can determine a perception parameter indicative of a state of the object. The determination of the perception parameter indicative of a state of the object may be performed directly on the thermal sensor data (such as thermal images, such as to detect a living organism or life) and/or fusion with other modalities (such as from non-thermal sensor data 506).

For example, FIG. 6E shows an object where the system 500 would determine a perception parameter indicative of a state of the object as active moving. As shown, the system 500 could obtain thermal sensor data 504 indicative of a warm cabin 630 and tires 632 of the object. The system could obtain non-thermal sensor data 506 and/or thermal sensor data 504 indicative of the object moving. Based on the thermal sensor data 504 and the non-thermal sensor data 506, the system 500 can determine a perception parameter indicative of a state of the object as active moving.

For example, FIG. 6F shows an object where the system 500 would determine a perception parameter indicative of a state of the object as active stationary. As shown, the system 500 could obtain thermal sensor data 504 indicative of a warm cabin 630 of the object. The system could obtain non-thermal sensor data 506 and/or thermal sensor data 504 indicative of the object remaining stationary. Based on the thermal sensor data 504 and the non-thermal sensor data 506, the system 500 can determine a perception parameter indicative of a state of the object as active stationary. From this, the system 500 can determine how much a vehicle poses a risk e.g. of pulling out, driving off, and/or disembarking passengers in the near future.

For example, FIG. 6G shows an object where the system 500 would determine a perception parameter indicative of a state of the object as inactive stationary. As shown, the system 500 could obtain thermal sensor data 504 indicative of no thermal activity from the object. The system could obtain non-thermal sensor data 506 indicative of the object remaining stationary. Based on the thermal sensor data 504 and the non-thermal sensor data 506, the system 500 can determine a perception parameter indicative of a state of the object as inactive stationary.

Figure 7:
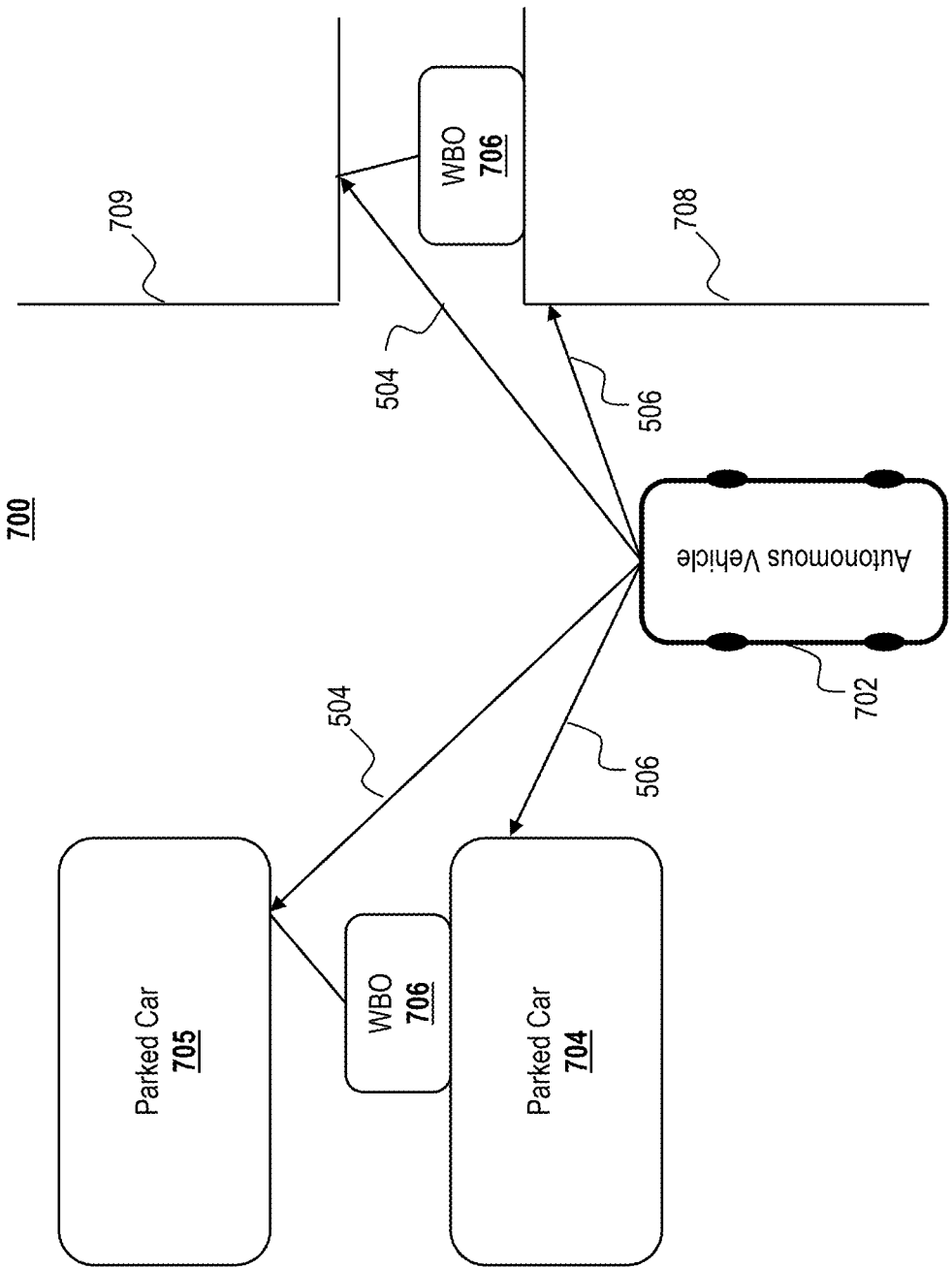
FIG. 7 is a diagram of an example scenario of a process for thermal sensor data vehicle perception.

FIG. 7 illustrates a diagram of an example scenario 700 where one or more examples of the disclosed technique are applied for thermal sensor data vehicle perception. Advantageously, the system, such as system 500 of FIG. 5A, of the autonomous vehicle 702 can be configured to determine a perception parameter indicative of an object that is occluded from the autonomous vehicle 702.

As shown in FIG. 7, an autonomous vehicle 702 may be driving down a drivable road surface. There may be warm bodied objects 706, such as pedestrians, that the vehicle 702 may not be aware of. Specifically, the system 500 may not be able to directly obtain sensor data indicative of the objects 706, such as non-thermal sensor data 506, as they are occluded by, for example, parked car 704 and building 708.

Advantageously, the system 500 can be configured to obtain thermal sensor data 504 indicative of a reflection of the warm bodied objects 706, for example in the window of parked car 705 and/or the shop front window of building 709, such as windows, plastic, and/or metal parts. The system 500 can determine a perception parameter, based on the thermal sensor data 504, indicative of the warm bodied objects 706 and generate a trajectory based on the perception parameter. The autonomous vehicle 706, such as via system 500, can operate through the drivable road surface.

Referring now to FIG. 8, illustrated is a flowchart of an example method or process 800 for thermal sensor data vehicle perception, such as for operating and/or controlling an AV. The method can be performed by a system disclosed herein, such as an AV compute 400 and/or 540, and a vehicle 102, 200, of FIGS. 1, 2, 3, 4, and 5A-5B, and implementations and/or systems disclosed herein as illustrated in of FIGS. 5A-7. The system disclosed, such as system 500, can include at least one processor which can be configured to carry out one or more of the operations of method 800.

Disclosed herein is a method 800. In one or more example methods, the method 800 can include obtaining in step 802, by at least one processor, thermal sensor data associated with an environment in which an autonomous vehicle is operating. In one or more example methods, the method 800 can include obtaining, using the at least one processor, non-thermal sensor data associated with the environment in step 804. In one or more example methods, the method 800 can include determining, in step 806, using the at least one processor, based on the thermal sensor data and the non-thermal sensor data, a perception parameter indicative of an object in the environment. In one or more example methods, the method 800 can include generating, in step 808, using the at least one processor, based on the perception parameter, a trajectory for the autonomous vehicle.

The perception parameter can be indicative of the presence of an object. For example, objects can include agents, animals, cars, people, roads, conditions of the road, and tracks.

In one or more example methods, the method 800 can include determining, using the at least one processor, based on the thermal sensor data, a reaction parameter for an emergency reaction. In one or more example methods, the method 800 can include generating, using the at least one processor, based on the reaction parameter, a second trajectory for the autonomous vehicle.

For example, the method 800 can include a quick reaction, such as for immediate reaction of the autonomous vehicle.

In one or more example methods, the object can be an agent.

An agent can be an object capable of dynamic movement.

In one or more example methods, the thermal sensor data can be obtained from one or more of: a thermal camera and an infrared thermal sensor.

In one or more example methods, the non-thermal sensor data can be obtained from one or more of: an image sensor, a Light Detection and Ranging (LiDAR) sensor, a RADAR sensor, and an ultrasonic sensor.

An image sensor may be a camera.

In one or more example methods, the perception parameter can be indicative of a state of the object.

For example, a state may be indicative of activity of the object, e.g. indicating whether the object is active or not. An object may be active moving, active stationary, or inactive stationary. For example, determining the perception parameter indicative of the state of the object may include inferring, based on thermal sensor data, the state of the object. Thermal sensor data can be collected from vehicles: cabin hot or cooled, engine status heat, exhaust fumes, wheels hot, lights hot, mirrors hot. From these thermal sensor data, it can be inferred how much a vehicle poses a risk with respect to driving off or disembarking occupants in the near future.

In one or more example methods, the perception parameter can be indicative of a feature of the object.

A feature may characterize the object, e.g. in space, e.g. geometrically and/or functionally. The feature may indicate the type of objects to which the object belongs, such as living object type, non-living object type. This makes feature-based tracking easier than in daylight camera.

In one or more example methods, the feature can be one or more of: a light, a doorknob, a window frame, and a window.

The feature may indicate a type of vehicle.

In one or more example methods, the object can include a driving surface.

The driving surface may be a road. The perception parameter may indicate a condition of the driving surface, e.g. road condition, such as ice patch, snow patch, water on. The perception parameter may indicate a track, such as an animal track.

In one or more example methods, the thermal sensor data is one or more of: thermal sensor data of the object and thermal sensor data of a reflection of the object.

For example, a reflection may help detecting occluded objects. For example, when a Warm Bodied Object, WBO, enters a drivable road surface between parked vehicles, the infrared waves are reflecting on the car surfaces such as windows, plastic or metal parts. For example, when a WBO enters drivable road surface from an occluded sidewalk, the infrared waves can be reflecting on building around the sidewalk.

In one or more example methods, the method 800 can further include determining, using the at least one processor, based on the thermal sensor data and the perception parameter, one or more segments of the object.

Thermal sensor data can be used for segmenting the object as two objects rarely have the same temperature. Portions of objects may not have the same temperature.

In one or more example methods, generating the trajectory for the autonomous vehicle can include prioritizing, using the at least one processor, based on the perception parameter, the object.

For example, the method 800 can include determining a priority parameter, ordering objects based on priority, and prioritizing objects in thermal sensor data.

In one or more example methods, the method 800 can include predicting, using the at least one processor, based on the perception parameter, an object trajectory of the object.

For example, the method 800 can include overlaying textures and/or applying reverse ray tracing. For example, the object trajectory may be predicted based on the thermal sensor data of the reflection of the object.

In one or more example methods, predicting the object trajectory can include overlaying, using the at least one processor, based on the perception parameter, a representation of the thermal sensor data on a three-dimension reconstruction of the object. In one or more example methods, predicting the object trajectory can include estimating, using the at least one processor, based on the perception parameter, a location of the object. In one or more example methods, predicting the object trajectory can include predicting, using the at least one processor, based on the estimated location, the object trajectory of the object.

In one or more example methods, generating the trajectory for the autonomous vehicle can include generating, using the at least one processor, based on the object trajectory, the trajectory for the autonomous vehicle.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

Also disclosed are methods, non-transitory computer readable media, and systems according to any of the following items:

Item 1. A method comprising:
 obtaining, by at least one processor, thermal sensor data associated with an environment in which an autonomous vehicle is operating;
 obtaining, using the at least one processor, non-thermal sensor data associated with the environment;
 determining, using the at least one processor, based on the thermal sensor data and the non-thermal sensor data, a perception parameter indicative of an object in the environment; and
 generating, using the at least one processor, based on the perception parameter, a trajectory for the autonomous vehicle.

Item 2. The method of Item 1, the method comprising:
 determining, using the at least one processor, based on the thermal sensor data, a reaction parameter for an emergency reaction; and
 generating, using the at least one processor, based on the reaction parameter, a second trajectory for the autonomous vehicle.

Item 3. The method of any one of the preceding Items, wherein the object is an agent.

Item 4. The method of any one of the preceding Items, wherein the thermal sensor data is obtained from one or more of: a thermal camera and an infrared thermal sensor.

Item 5. The method of any one of the preceding Items, wherein the non-thermal sensor data is obtained from one or more of: an image sensor, a Light Detection and Ranging (LiDAR) sensor, a RADAR sensor, and an ultrasonic sensor.

Item 6. The method of any one of the preceding Items, wherein the perception parameter is indicative of a state of the object.

Item 7. The method of any one of the preceding Items, wherein the perception parameter is indicative of a feature of the object.

Item 8. The method of Item 7, wherein the feature is one or more of: a light, a doorknob, a window frame, and a window.

Item 9. The method of any one of the preceding Items, wherein the object comprises a driving surface.

Item 10. The method of any one of the preceding Items, wherein the thermal sensor data is one or more of: thermal sensor data of the object and thermal sensor data of a reflection of the object.

Item 11. The method of any one of the preceding Items, further comprising determining, using the at least one processor, based on the thermal sensor data and the perception parameter, one or more segments of the object.

Item 12. The method of any one of the preceding Items, wherein generating the trajectory for the autonomous vehicle comprises prioritizing, using the at least one processor, based on the perception parameter, the object.

Item 13. The method of any one of the preceding Items, the method comprising:
    predicting, using the at least one processor, based on the perception parameter, an object trajectory of the object.

Item 14. The method of Item 13, wherein predicting the object trajectory comprises:
    overlaying, using the at least one processor, based on the perception parameter, a representation of the thermal sensor data on a three-dimension reconstruction of the object;
    estimating, using the at least one processor, based on the perception parameter, a location of the object; and
    predicting, using the at least one processor, based on the estimated location, the object trajectory of the object.

Item 15. The method of any of Items 13-14, wherein generating the trajectory for the autonomous vehicle comprises generating, using the at least one processor, based on the object trajectory, the trajectory for the autonomous vehicle.

Item 16. A non-transitory computer readable medium comprising instructions stored thereon that, when executed by at least one processor, cause the at least one processor to carry out operations comprising:
    obtaining, by at least one processor, thermal sensor data associated with an environment in which an autonomous vehicle is operating;
    obtaining, using the at least one processor, non-thermal sensor data associated with the environment;
    determining, using the at least one processor, based on the thermal sensor data and the non-thermal sensor data, a perception parameter indicative of an object in the environment; and
    generating, using the at least one processor, based on the perception parameter, a trajectory for the autonomous vehicle.

Item 17. The non-transitory computer readable medium of Item 16, wherein the instructions, when executed by at least one processor, cause the at least one processor to carry out operations comprising:
    determining, using the at least one processor, based on the thermal sensor data, a reaction parameter for an emergency reaction; and
    generating, using the at least one processor, based on the reaction parameter, a second trajectory for the autonomous vehicle.

Item 18. The non-transitory computer readable medium of any one of Items 16-17, wherein the object is an agent.

Item 19. The non-transitory computer readable medium of any one of Items 16-18, wherein the thermal sensor data is obtained from one or more of: a thermal camera and an infrared thermal sensor.

Item 20. The non-transitory computer readable medium of any one of Items 16-19, wherein the non-thermal sensor data is obtained from one or more of: an image sensor, a Light Detection and Ranging (LiDAR) sensor, a RADAR sensor, and an ultrasonic sensor.

Item 21. The non-transitory computer readable medium of any one of Items 16-20, wherein the perception parameter is indicative of a state of the object.

Item 22. The non-transitory computer readable medium of any one of Items 16-21, wherein the perception parameter is indicative of a feature of the object.

Item 23. The non-transitory computer readable medium of Item 22, wherein the feature is one or more of: a light, a doorknob, a window frame, and a window.

Item 24. The non-transitory computer readable medium of any one of Items 16-23, wherein the object comprises a driving surface.

Item 25. The non-transitory computer readable medium of any one of Items 16-24, wherein the thermal sensor data is one or more of: thermal sensor data of the object and thermal sensor data of a reflection of the object.

Item 26. The non-transitory computer readable medium of any one of Items 16-25, wherein the instructions, when executed by at least one processor, cause the at least one processor to carry out operations comprising:
    determining, using the at least one processor, based on the thermal sensor data and the perception parameter, one or more segments of the object.

Item 27. The non-transitory computer readable medium of any one of Items 16-26, wherein generating the trajectory for the autonomous vehicle comprises prioritizing, using the at least one processor, based on the perception parameter, the object.

Item 28. The non-transitory computer readable medium of any one of Items 16-27, wherein the instructions, when executed by at least one processor, cause the at least one processor to carry out operations comprising:
    predicting, using the at least one processor, based on the perception parameter, an object trajectory of the object.

Item 29. The non-transitory computer readable medium of Item 28, wherein predicting the object trajectory comprises:
    overlaying, using the at least one processor, based on the perception parameter, a representation of the thermal sensor data on a three-dimension reconstruction of the object;
    estimating, using the at least one processor, based on the perception parameter, a location of the object; and
    predicting, using the at least one processor, based on the estimated location, the object trajectory of the object.

Item 30. The non-transitory computer readable medium of any of Items 28-29, wherein generating the trajectory for the autonomous vehicle comprises generating, using the at least one processor, based on the object trajectory, the trajectory for the autonomous vehicle.

Item 31. A system, comprising at least one processor; and at least one memory storing instructions thereon that, when executed by the at least one processor, cause the at least one processor to:
  obtain thermal sensor data associated with an environment in which an autonomous vehicle is operating;
  obtain non-thermal sensor data associated with the environment;
  determine, based on the thermal sensor data and the non-thermal sensor data, a perception parameter indicative of an object in the environment; and
  generate, based on the perception parameter, a trajectory for the autonomous vehicle.

Item 32. The system of Item 31, wherein the instructions, when executed by at least one processor, cause the at least one processor to:
  determine, based on the thermal sensor data, a reaction parameter for an emergency reaction; and
  generate, based on the reaction parameter, a second trajectory for the autonomous vehicle.

Item 33. The system of any one of Items 31-32, wherein the object is an agent.

Item 34. The system of any one of Items 31-33, wherein the thermal sensor data is obtained from one or more of: a thermal camera and an infrared thermal sensor.

Item 35. The system of any one of Items 31-34, wherein the non-thermal sensor data is obtained from one or more of: an image sensor, a Light Detection and Ranging (LiDAR) sensor, a RADAR sensor, and an ultrasonic sensor.

Item 36. The system of any one of Items 31-35, wherein the perception parameter is indicative of a state of the object.

Item 37. The system of any one of Items 31-36, wherein the perception parameter is indicative of a feature of the object.

Item 38. The system of Item 37, wherein the feature is one or more of: a light, a doorknob, a window frame, and a window.

Item 39. The system of any one of Items 31-38, wherein the object comprises a driving surface.

Item 40. The system of any one of Items 31-39, wherein the thermal sensor data is one or more of: thermal sensor data of the object and thermal sensor data of a reflection of the object.

Item 41. The system of any one of Items 31-40, wherein the instructions, when executed by at least one processor, cause the at least one processor to:
  determine, based on the thermal sensor data and the perception parameter, one or more segments of the object.

Item 42. The system of any one of Items 31-41, wherein to generate the trajectory for the autonomous vehicle comprises to prioritize, based on the perception parameter, the object.

Item 43. The system of any one of Items 31-42, wherein the instructions, when executed by at least one processor, cause the at least one processor to:
  predict, based on the perception parameter, an object trajectory of the object.

Item 44. The system of Item 43, wherein to predict the object trajectory comprises to:
  overlay, based on the perception parameter, a representation of the thermal sensor data on a three-dimension reconstruction of the object;
  estimate, based on the perception parameter, a location of the object; and
  predict, based on the estimated location, the object trajectory of the object.

Item 45. The system of any one of Items 43-44, wherein to generate the trajectory for the autonomous vehicle comprises to generate, based on the object trajectory, the trajectory for the autonomous vehicle.

What is claimed is:

1. A method comprising:
  obtaining, by at least one processor, thermal sensor data associated with an environment in which an autonomous vehicle is operating;
  obtaining, using the at least one processor, non-thermal sensor data associated with the environment;
  identifying, using the at least one processor, a thermal reflection on a surface of a first object in the environment based at least in part on the thermal sensor data;
  determining, using the at least one processor, a presence of a second object based at least in part on the identified thermal reflection on the surface of the first object; and
  generating, using the at least one processor, a trajectory for the autonomous vehicle based at least in part on the determined presence of the second object.

2. The method of claim 1, the method comprising:
  determining, using the at least one processor, based at least in part on the thermal sensor data, a reaction parameter for an emergency reaction; and
  generating, using the at least one processor, based at least in part on the reaction parameter, a second trajectory for the autonomous vehicle.

3. The method of claim 1, wherein the second object is an agent.

4. The method of claim 1, wherein the thermal sensor data is obtained from one or more of: a thermal camera and an infrared thermal sensor.

5. The method of claim 1, wherein the non-thermal sensor data is obtained from one or more of: an image sensor, a Light Detection and Ranging (LiDAR) sensor, a RADAR sensor, and an ultrasonic sensor.

6. The method of claim 1, wherein the identified thermal reflection on the surface of the first object is indicative of a state of the second object.

7. The method of claim 1, wherein the identified thermal reflection on the surface of the first object is indicative of a feature of the second object.

8. The method of claim 7, wherein the feature is one or more of: a light, a doorknob, a window frame, and a window.

9. The method of claim 1, wherein the first object comprises a driving surface.

10. The method of claim 1, further comprising determining, using the at least one processor, based on the thermal sensor data and the identified thermal reflection on the surface of the first object, one or more segments of the second object.

11. The method of claim 1, wherein generating the trajectory for the autonomous vehicle comprises prioritizing, using the at least one processor, based at least in part on the identified thermal reflection on the surface of the first object, the second object.

12. The method of claim 1, the method comprising:
  predicting, using the at least one processor, based at least in part on the identified thermal reflection on the surface of the first object, an object trajectory of the second object.

13. The method of claim 12, wherein predicting the object trajectory comprises:
  overlaying, using the at least one processor, based at least in part on the identified thermal reflection on the surface of the first object, a representation of the thermal sensor data on a three-dimension reconstruction of the second object;

estimating, using the at least one processor, based at least in part on the identified thermal reflection on the surface of the first object, a location of the second object; and predicting, using the at least one processor, based at least in part on the estimated location, the object trajectory of the second object.

14. The method of claim 12, wherein generating the trajectory for the autonomous vehicle comprises generating, using the at least one processor, based at least in part on the object trajectory, the trajectory for the autonomous vehicle.

15. A non-transitory computer readable medium comprising instructions stored thereon that, when executed by at least one processor, cause the at least one processor to carry out operations comprising:

obtaining, by at least one processor, thermal sensor data associated with an environment in which an autonomous vehicle is operating;

obtaining, using the at least one processor, non-thermal sensor data associated with the environment;

identifying, using the at least one processor, a thermal reflection on a surface of a first object in the environment based at least in part on the thermal sensor data;

determining, using the at least one processor, a presence of a second object based at least in part on the identified thermal reflection on the surface of the first object; and generating, using the at least one processor, a trajectory for the autonomous vehicle based at least in part on the determined presence of the second object.

16. A system, comprising at least one processor; and at least one memory storing instructions thereon that, when executed by the at least one processor, cause the at least one processor to:

obtain thermal sensor data associated with an environment in which an autonomous vehicle is operating;

obtain non-thermal sensor data associated with the environment;

identify a thermal reflection on a surface of a first object in the environment based at least in part on the thermal sensor data;

determine, using the at least one processor, a presence of a second object based at least in part on the identified thermal reflection on the surface of the first object; and generate a trajectory for the autonomous vehicle based at least in part on the determined presence of the second object.

17. The system of claim 16, wherein the at least one memory storing instructions, when executed by at least one processor, cause the at least one processor to:

predict, based at least in part on the identified thermal reflection on the surface of the first object, an object trajectory of the second object.

18. The system of claim 17, wherein to predict the object trajectory comprises to:

overlay, based at least in part on the identified thermal reflection on the surface of the first object, a representation of the thermal reflection on a three-dimension reconstruction of the second object;

estimate, based at least in part on the identified thermal reflection on the surface of the first object, a location of the second object; and predict, based at least in part on the estimated location, the object trajectory of the second object.

19. The method of claim 1, wherein the second object is occluded from the non-thermal sensor data.

20. The method of claim 1, wherein the second object is occluded from the autonomous vehicle.

* * * * *